United States Patent [19]

Blättermann et al.

[11] 4,440,537
[45] Apr. 3, 1984

[54] CONVEYOR SYSTEM

[75] Inventors: Karl-Günther Blättermann, Hamburg-Rahlstedt; Jürgen Paelke, Tostedt, both of Fed. Rep. of Germany

[73] Assignee: Conrad Scholtz AG, Hamburg, Fed. Rep. of Germany

[21] Appl. No.: 339,158

[22] Filed: Jan. 13, 1982

[30] Foreign Application Priority Data

Jan. 19, 1981 [DE] Fed. Rep. of Germany ....... 3101515
Jan. 28, 1981 [DE] Fed. Rep. of Germany ....... 3102731

[51] Int. Cl.³ .............................................. B65G 63/00
[52] U.S. Cl. .................................. 414/139; 198/509; 198/864
[58] Field of Search ............... 414/137, 138, 139, 140, 414/144, 145; 198/307, 509, 701, 711, 712, 839, 864

[56] References Cited

U.S. PATENT DOCUMENTS

| | | | |
|---|---|---|---|
| 684,859 | 10/1901 | Peck | 198/864 X |
| 1,377,800 | 5/1921 | Brown | 414/139 X |
| 3,603,447 | 9/1971 | Pott | 198/711 |
| 3,926,301 | 12/1975 | Herms | 414/139 X |

FOREIGN PATENT DOCUMENTS

| | | |
|---|---|---|
| 1274987 | 3/1969 | Fed. Rep. of Germany . |
| 1506997 | 12/1971 | Fed. Rep. of Germany . |
| 2116694 | 10/1972 | Fed. Rep. of Germany . |
| 2342322 | 12/1975 | Fed. Rep. of Germany . |
| 2456260 | 12/1976 | Fed. Rep. of Germany . |
| 2813182 | 10/1980 | Fed. Rep. of Germany . |
| 1417348 | 10/1965 | France | 198/701 |
| 459344 | 10/1950 | Italy | 414/139 |
| 55-123823 | 10/1980 | Japan | 414/139 |

OTHER PUBLICATIONS

Paelke, "New Developments in Vertical Conveying with Special Emphasis on the Transshipment of Bulk Material," Bulk Solids Handling, vol. 2, No. 1, Mar. 1982, pp. 1–8.

*Primary Examiner*—Robert J. Spar
*Assistant Examiner*—Ken Muncv
*Attorney, Agent, or Firm*—Bell, Seltzer, Park & Gibson

[57] ABSTRACT

In a conveyor system for bulk materials used for loading and unloading large containers, and particularly ships, including a gantry, a boom pivotally mounted on the gantry, a vertically positioned leg extending from the boom and mounted to rotate relative to the boom and conveyor belt devices movably carried by the gantry, the boom and the leg for conveying the bulk materials, improvements are provided which are characterized by providing a simplified construction of the conveyor system allowing both loading and unloading operations and eliminating the necessity of plural conveyor belts by utilizing a single continuous conveyor belt, spaced guide mechanisms for the conveyor belt carried by the rotating leg and by the boom for allowing the conveyor belt to twist with rotation of the leg relative to the boom, and a motor for selectively driving the conveyor belt in forward and reverse directions for loading and unloading bulk material.

10 Claims, 5 Drawing Figures

CONVEYOR SYSTEM

FIELD OF THE INVENTION

This invention relates to a conveyor system for bulk material used for loading and unloading large containers, in particular ships, of the type including a gantry, a boom having one end thereof mounted on the gantry for pivotal movement of the boom about a horizontal axis in a vertical plane, a leg member extending from the boom downwardly along a vertical axis, devices for pivotally connecting the boom to the leg while allowing the leg to maintain its vertical orientation regardless of the position of the boom and for rotating the leg about the vertical axis relative to the boom, and conveyor belts movably carried by the gantry, the boom and the leg for conveying bulk materials between the free end of the leg and the gantry.

BACKGROUND OF THE INVENTION

A conveyor system of this type for unloading only of bulk material from ships with the features described above is known from German Auslegeschrift No. 2,813,182. The conveyor system of this patent publication utilizes two separate conveyor belts in the boom and in the vertical leg member, so as to enable a pivotability or rotatability of the vertical leg with respect to the boom which is necessary to reach all areas in the interior of a ship. Between the upper end of the vertical leg and the outer end of the boom, the bulk material arriving on the conveyor belt in the vertical leg, must be transferred to the other conveyor belt traveling in the boom to the gantry. However, it is difficult to so design and construct the point of material transfer that the bulk material is properly and entirely transferred in all positions of the vertical leg relative to the boom. For this purpose, this conveyor system possesses, among other things, a bow-shaped or C-shaped guide surface for the conveyor belt in the vertical leg with a cover belt extending over the conveyor belt traveling in the boom. This design makes the vertical leg extensive and heavy.

In another known conveyor system of a similar design disclosed in German Pat. No. 1,274,987, a separate intermediate conveyor belt is arranged at the point of material transfer between the conveyor belt in the vertical leg and the conveyor belt in the boom. This arrangement reduces somewhat the dimensions of the vertical leg though, but provides two points of material transfer.

On account of these material transfer points, both of the above described conveyor systems can only operate in one direction, and are thus directed to only unload ships and are not capable of selectively loading and unloading ships.

OBJECT AND SUMMARY OF THE INVENTION

The object of this invention is to create a conveyor system for bulk material, which is simple in its design and yet suitable for both loading and unloading large containers, particularly ships, with a belt supporting leg being adapted to pivot relative to a boom.

According to the invention, this object is obtained by providing a conveyor system of the above described type and having the following improvements.

The conveyor belt system of the present invention, possesses only one flexible continuous conveyor belt which extends from the lower end of the vertical belt supporting leg to the gantry, and thus eliminates any point of material transfer. For this reason, the system can be used for both loading and unloading a ship, for example, in that the traveling direction of the conveyor belt is simply reversed. Moreover, the conveyor system requires only one conveyor belt drive, which reduces constructional costs and energy consumption. In addition, the bulk material does not spill over, nor does any dust develop, as would be the case if there were a material transfer point. Thus, the new conveyor system is very favorable to the environment.

Despite the presence of a continuous conveyor belt, there is no interference with pivoting or rotating the vertical belt supporting leg about practically 360° relative to the boom. This is achieved in that two belt guide mechanisms are provided, one at generally the end or connection of the boom with the vertical leg, and the other spaced-apart therefrom on the vertical belt supporting leg, between which the conveying and returning segments of the belt travel unguided or unrestrained, so that they can practically twist about each other in this segment of their travel, when the belt supporting leg and thus the lower belt guide mechanism are rotated relative the boom and thus the upper belt guide mechanism. The belt supporting leg is rotated, thereby correspondingly twisting the conveyor belt, with its edges taking a helical course in this twisted condition, by up to 180° to each side proceeding from a normal position, in which both belt guide mechanisms are in the same angular position, and in which consequently the conveying and returning segments of the belt travel untwisted therebetween, i.e., each of them travels in one plane, which is in practice parallel to the plane of the other.

Theoretical investigations have shown that an elongation of the belt occurring in its twisted condition, remains within absolutely controllable limits. Thus, the peaks of elongation in the marginal area of a 1400 mm wide conveyor belt, with the belt guide mechanisms being 16 m apart, are less than 15 $^o/_{oo}$ [1.5%]. This value applies to the most suitable embodiment, in which the vertical pivoting axis of the belt supporting leg extends approximately through the center of each belt guide mechanism. In other words, the conveying and returning segments of the belt travel in vertical direction on both sides of the (imaginary) pivoting axis, and their edges are equidistant from same.

The combination of the corrugated side walls of the conveyor belt and the cleats extending transversely thereto and being preferably angular, makes it possible for the bulk material to be transported without problems even in the steep segments of its travel, i.e., when it is transported in the belt supporting leg or in a steeply placed boom. More specifically, the conveyor belt need not be covered, which is hardly possible anyway in the segment of its twisted travel.

From the foregoing it results that the two belt guide mechanisms are directed to limit the twisting of the conveyor belt when pivoting the belt supporting leg, to the segment of the belt travel between the two guide mechanisms, and thus to ensure that the conveyor belt runs perfectly straight in the other segments of the conveyor system. To this effect, it is particularly suitable and likewise simple to so design each belt guide mechanism that each of the conveying and the returning segments of the belt is clamped between two stub rolls and one backing roll. It is sufficient to only use one backing roll, which abuts both the conveying and the returning belt segments, so that the diameter of the backing roll also determines the spacing between these two belt sides. However, there can be a certain slippage between the conveyor belt and the backing roll, since the loaded conveying belt segment has, due to the belt elongation, a slightly different momentary speed than the unloaded returning belt segment. Should this wear-conducive slippage present a problem, two separate backing rolls can be provided, or the one backing roll can be coated with a soft rubber, which is divided into individual rings, if necessary.

It is easier to twist the conveyor belt, the greater the spacing is between the two belt guide mechanisms. For this reason, the lower belt guide mechanism is suitably installed at the lower end of the vertical belt supporting leg. The twisting is further facilitated in that the cleats of the conveyor belt are preferably not secured to the actual conveyor belt in their center areas. They then provide only little resistance to the tangential stresses as they occur in the belt surface when the belt is twisted.

The aforesaid unguided or unrestrained travel of the conveyor belt between the two belt guide mechanisms is to be understood as an absence of a guide surface to that extent that the plane of the conveyor belt or, respectively, of both its conveying and returning segments can freely adjust itself at any point between the two belt guide mechanisms. Yet, it is quite desirable to limit or avoid, when the conveyor belt is twisted, a concomitant approach of the conveying and returning belt segments toward each other, so that the inner sides of the conveying and returning segments of the conveyor belt do not touch each other at a certain twist from the normal position. This is advantageously accomplished with at least one spacer arranged between the conveying and the returning belt segments, with a free rotatability of the spacer about a vertical axis being provided, so that the spacer does not prevent the conveyor belt from twisting over the entire length between the two belt guide mechanisms. Each spacer preferably comprises one or two backing rolls positioned for transversely abutting the inner side of the conveying and returning segments of the conveyor belt.

In a suitable further development of the conveyor system, the conveyor belt on the gantry travels in a retracted loop which serves to compensate for elongation, and is, for example, readjusted to a certain belt tension by means of a weight or an automatic hydraulic system. This also compensates for the elongation which occurs due to the twisting of the conveyor belt, if particularly low elongation values are desired. Furthermore, the belt loop can provide for compensation of length with the same read-justment system, which becomes necessary when moving the normally vertically pivotable boom so as to consider correspondingly variable, transitional lengths between the gantry and boom or, respectively, between the boom and belt supporting leg. Finally, in conjunction with a coarse adjustability of the belt loop, the boom can also be horizontally displaced relative to the gantry, which makes it easy or possible to reach hardly accessible areas in the interior of the container to be loaded or unloaded.

A constructionally and particularly simple and very space-saving suspension of the belt supporting leg from the boom is accomplished with the use of a device connecting the boom to the vertical leg and including a horizontal turntable, which encloses both the conveying and the returning segments of the conveyor belt. If additionally a self-supporting tube is used as boom and, respectively, as belt supporting leg, and if the turntable is directly connected to the tube of the boom, on one hand, and to that of the belt supporting leg, on the other hand, a conveyor system is obtained, in which the conveyor belt is fully enclosed from the point of material transfer to the gantry, thereby excellently protecting, on one hand, the conveyed bulk material from environmental influences, but also the environment, on the other, when harmful bulk material is conveyed.

BRIEF DESCRIPTION OF THE DRAWINGS

Some of the objects and advantages of this invention having been stated above, other objects and advantages will appear as the description proceeds when taken in conjunction with the accompanying drawings, in which.

DETAILED DESCRIPTION OF PREFERRED EMBODIMENTS

Figure 1:
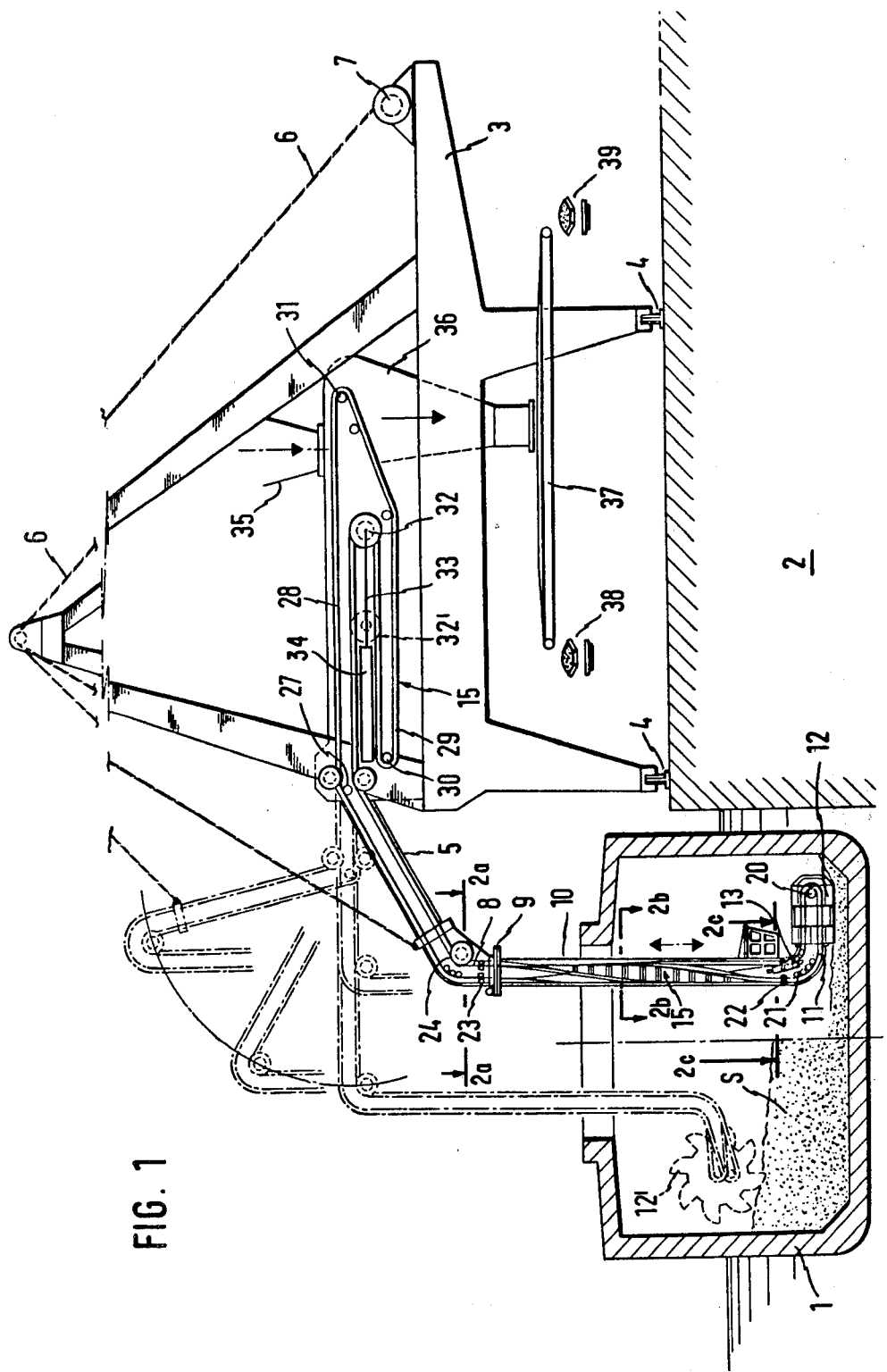
FIG. 1 is a schematic side elevational view of a conveyor system for bulk material used for loading and unloading ships in accordance with this invention.

As illustrated in the drawings, the conveyor system for bulk material S, for example coal, is installed in a port and serves to load and unload ships 1, which are moored along pier 2.

The conveyor system comprises a gantry 3 which travels on rails 4 along ship 1 on pier 2. A boom 5 is arranged on the gantry 3, which reaches over ship 1 and is adapted to pivot in a vertical plane about a horizontal axis parallel to the rails 4. To do so, the boom 5 has one end thereof pivotally attached to the gantry framework, in any suitable manner not shown in detail, which can be displaced on the gantry transversely to the rails 4 in horizontal direction, whereby the boom is also horizontally displaceable in any pivoting position, as is shown in dash-dot lines. A rope 6 leading to a winch 7 pivots boom 5. At its free end, boom 5 possesses an end or connecting piece 8, which is adapted to pivot relative to the actual boom 5 about a horizontal, transverse axis parallel to rails 4, and which is vertically downwardly directed in any pivotal position of the boom.

A horizontal turntable 9 connects to and forms a port of the connecting or end piece 8, over which turntable a vertical belt supporting leg 10 is connected and suspends from end piece 8 and thus from boom 5. Turntable 9 defines a vertical pivoting axis 9' extending through its center, about which axis the belt supporting leg 10 is pivoted relative to boom 5. FIG. 1 shows the belt supporting leg in dash-dot lines in a so-called normal position and, in fully drawn out lines, in a position rotated by 180° thereto.

Pivoted to the lower end of the vertical belt supporting leg 10 is a short transverse leg 11, which accommodates a pickup device 12 for the bulk material S. Normally, transverse leg 11 extends horizontally. However, it is also adapted, by means of a hydraulic cylinder 13, to pivot over a limited angle range of about 15° from the horizontal relative to the belt supporting arm 10, as is shown in dash-dot lines.

Boom 5, its end or connecting piece 8 and belt supporting leg 10 are each designed as self-supporting, enclosed tubes. All tubes have the same diameter. Even the inside diameter of turntable 9 is identical with that of the tubes. A lamellar cover, not shown in detail, is respectively provided at the junction of boom 5 and its end piece 8, as well as at the junction of the vertical belt supporting leg 10 and transverse leg 11, so as to keep the space formed by the tubes at each junction also closed in any pivotal position.

Figure 3:
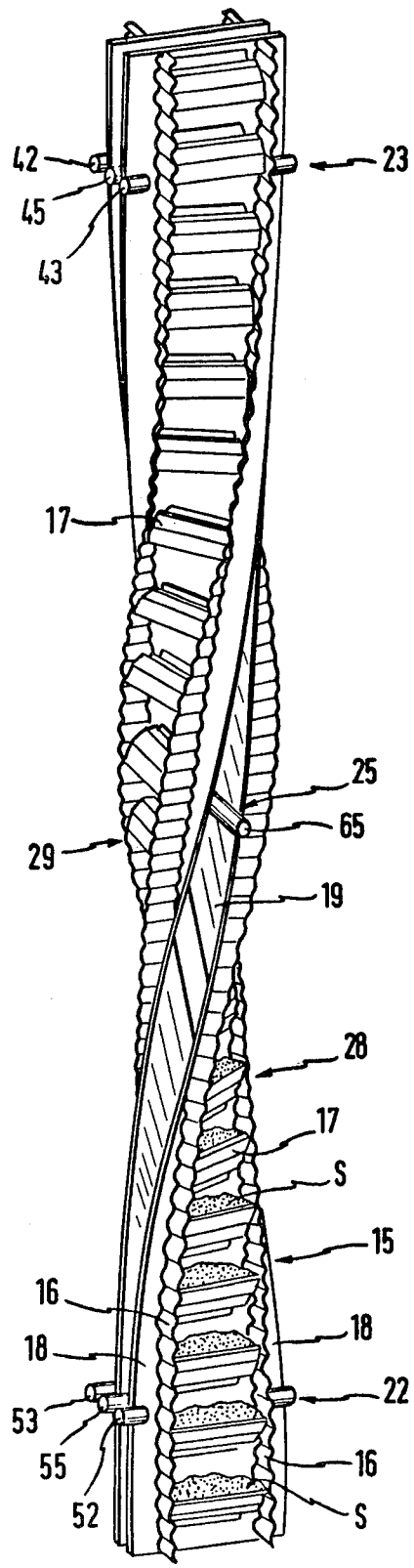
FIG. 3 is an isometric view of the conveyor belt travel in the belt supporting leg of the conveyor system in an embodiment slightly modified from that of FIGS. 1 and 2.

The conveyor system is provided with a single, flexible, continuous conveyor belt 15 extending from the pickup device 12 to the gantry 3. This belt is a so-called corrugated wall belt, i.e., it possesses two flexible laterally arranged corrugated walls 16, between which transversely extending cleats 17 are arranged regularly spaced-apart over the length of the belt, which cleats have an angular cross section, and thus form bucket-shaped compartments to take up the bulk material S (FIG. 3). In their center area, the cleats are not secured to the actual conveyor belt. The corrugated walls 16 are slightly spaced inwardly from the edges of the actual conveyor belt 15, thus leaving on the outer side of the conveyor belt two narrow marginal areas 18 outside of the conveying space of the belt, which marginal areas make it possible to cooperate unobstructedly with deflecting means. The inner side 19 of the conveyor belt is smooth over its entire width.

More specifically, conveyor belt 15 is guided from an end drum 20 on the free end of transverse leg 11, via a deflecting mechanism 21 at the junction of transverse leg 11 and the vertical belt supporting leg 10, further via a directly following, lower belt guide mechanism 22, an upper belt guide mechanism 23 located in the connecting piece 8, a then following deflecting mechanism 24 at the junction of connecting piece 8 and boom 5, and finally via a deflecting mechanism 27 at the junction of boom and boom framework to a driven end drum 30 mounted on the gantry. Arranged on one side of drum 30 is a discharge drum 31, and located on the other side thereof is a retracted belt loop 33 which is formed by means of a deflecting double wheel 32, a so-called stepped pulley, mounted to the gantry, and which first serves to compensate for length, when boom 5 is horizontally displaced, as is indicated by double wheel 32' shown in dash-dot lines. The limited, automatically effected displacement of double wheel 32 relative the boom framework further compensates for the changed length of the conveyor belt travel, which occurs when belt supporting leg 10 is rotated and boom 5 is pivoted. For this purpose, a hydraulic cylinder 34 becomes operative on double wheel 32, which cylinder keeps the belt tension registered by a pressure gauge at a certain value. The drive of end drum 30 and thus the conveyor belt 15 is, for example, reversible by changing the poles of any suitable electric motor, not shown, so as to change from a loading to an unloading operation and vice versa.

The upwardly directed belt segment 28 of conveyor belt 15 which is horizontally guided over gantry 3, is the conveying belt segment. In the loading operation it is loaded through a feed hopper 35, and it discharges the bulk material S at the lower end drum 20. In the unloading operation, it is loaded by pickup device 12 in the horizontal segment of transverse leg 11, and discharges, before the returning belt segment 29 starts to travel in the loop pattern 33 at discharge drum 31, into a transfer hopper 36, which delivers the bulk material S to a transverse conveyor belt 37, which again selectively delivers it onto one of the two conveyor belts 38 and 39. A beater mechanism, not shown in detail, can be associated to both the lower end drum 20 and discharge drum 31, so as to improve the unloading of the conveyor belt 15 when sticky bulk material is transported.

In FIG. 1, pickup device 12 is shown as a drum, which unloads inwardly onto conveyor belt 15. Alternatively however, a conventional bucket wheel 12' may be used as a pickup device, which is, for example, laterally arranged on transverse leg 11 and unloads sideways onto conveyor belt 15. This is illustrated in FIG. 1 in dash-dot lines. Also, a double-bucket wheel, unloading from its center onto the conveyor belt and, thus, particularly evenly loading the conveyor belt, can be used. Finally, if it is a sensitive bulk material, for example grain, that is picked up, a self-scooping conveyor belt, due to the corresponding design of its cleats, can be used.

Conveyor belt 15 with its conveying and returning segments 28, 29 travels in the tubes of the vertical belt supporting leg 10, connecting piece 8 and boom 5. For this reason, also the deflecting and guide means 21–24 are arranged in the tubes. The upper deflecting mechanism 24 comprises a deflecting double wheel for the returning belt segment 29 and, in concentric relationship thereto, a so-called curved roller track, i.e., a number of rolls with a comparatively small diameter arranged along the deflecting guide surface. The lower deflecting mechanism 21 is formed by two roller tracks. The lower belt guide mechanism 22 is located directly above the lower deflecting mechanism 21 and is firmly connected with and mounted on the vertical belt supporting leg 10. The upper belt guide mechanism 23 is arranged below the deflecting mechanism 24 and is firmly connected with and mounted on connecting end 8 of boom 5. Between these guide mechanisms both the conveying and returning belt sides travel essentially unrestrained and unguided. There is only, in half height or halfway between the two belt guide mechanisms 22, 23, a spacer 25 (FIGS. 2b and 3) which is not shown in FIG. 1 and which substantially prevents the two belt segments 28, 29 from contacting each other on their inner sides.

Figure 2A:
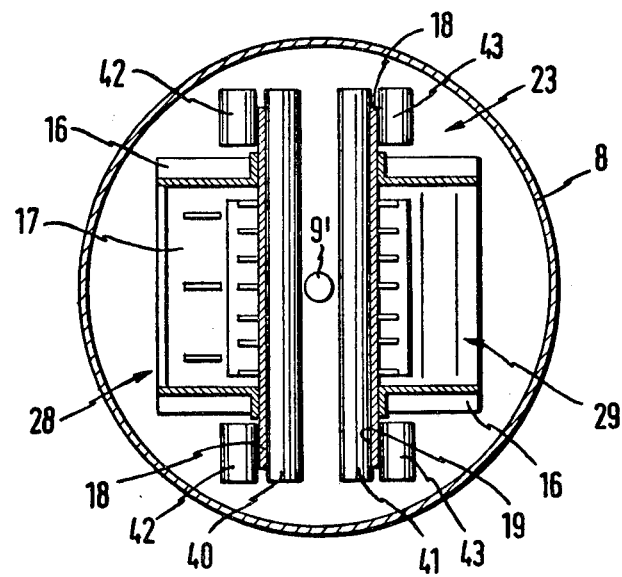
FIGS. 2a-c are cross-sectional views of the vertical belt supporting leg of the conveyor system according to FIG. 1, and taken respectively generally along the lines 2a—2a, 2b—2b and 2c—2c of FIG. 1.
Figure 2B:
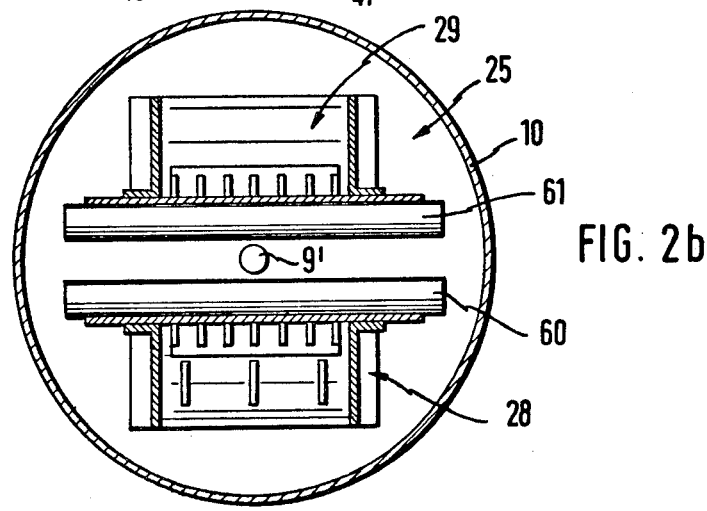
Figure 2C:
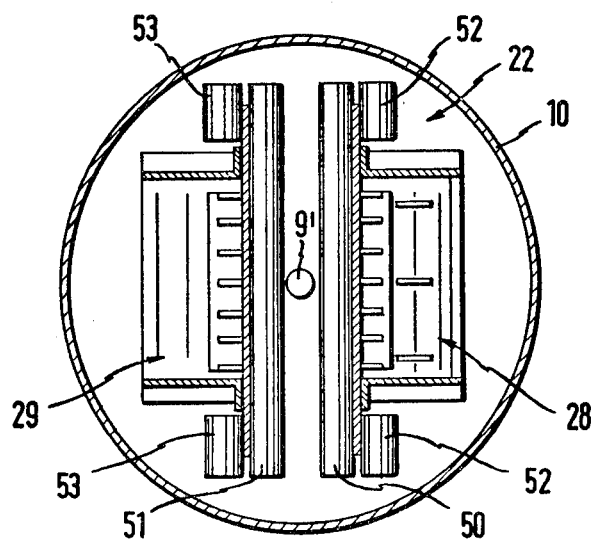

Further details of the belt guide mechanisms 22 and 23 and of the belt travel between them are shown in FIGS. 2a–2c, with the belt supporting leg 10 being in the same rotated position as shown in solid lines in FIG. 1.

As shown in FIG. 2a, the upper belt guide mechanism 23 preferably comprises two horizontal, freely rotating backing rolls 40, 41 in parallel relationship to each other, which abut the respective inner sides 19 of conveying belt segments 28 and returning belt side 29. Co-operating with the backing roll 40 are, on the same level therewith and parallel thereto, two stub rolls 42, which abut the narrow marginal areas 18 of the conveying segment 28 the conveyor belt 15 and thus press it against backing roll 40. In the same manner, two stub rolls 43 cooperate with backing roll 41. The bearing support means for rolls 40–43, which are firmly connected to connecting piece 8, are not shown in detail, but may be of any suitable construction for rotatably mounting such rolls 40–43 in fixed angular position to remain and maintain the portion of the conveyor belt 15 passing therethrough in a fixed angular position with respect to the vertical axis 9' through the vertical leg 10 regardless of the rotated position of the vertical leg 10. The belt guide mechanism 23 is so positioned in the connecting piece 8 that the pivoting axis 9' of the vertical belt supporting leg 10 extends through the center of the belt guide mechanism 23. Accordingly, the belt guide mechanism 23 keeps the two segments 28, 29 of the conveyor belt 15 in two vertical planes parallel to each other, so that all four marginal areas 18 are equally spaced apart from pivoting axis 9'.

The lower belt guide mechanism 22 also preferably comprises two horizontal, freely rotating backing rolls 50, 51 in parallel relationship to each other which abut the respective inner sides 19 of the conveying belt segments 28 and returning belt segments 29. Cooperating with the backing roll 40 are, on the same level therewith and parallel thereto, two stub rolls 52, which abut the narrow marginal areas 18 of the conveying segment 28 of the conveyor belt 15 and thus press it against backing roll 50. In the same manner, two stub rolls 53 cooperate with backing roll 51. The bearing support means for rolls 50–53, which are firmly connected to the vertical leg 10, are not shown in detail, but may be of any suitable construction for rotatably mounting such rolls 50–53 in fixed angular position on the vertical leg 10 to rotate and rotate the portion of the conveyor belt 15 passing therethrough with the vertical leg 10 to allow twisting of the conveyor belt 15 between the respective guide mechanisms 22, 23.

When vertical belt supporting leg 10 is in its normal position, belt guide mechanism 22 imparts to each conveyor belt segment 28, 29 the same plane as does belt guide mechanism 23, so that both segments 28, 29 of the conveyor belt 15 travel straight and parallel to each other between the two belt guide mechanisms, as is shown in FIG. 1 in dash-dot lines. When the vertical belt supporting leg 10 is rotated, and thus belt guide mechanism 22, both segments 28, 29 of the conveyor belt 15 are twisted, with the marginal areas 18 traveling a helical course (FIG. 3). The more vertical belt supporting leg 10 is rotated or deviates from its normal position, the more the belt 15 is twisted. A maximum twisting of the belt 15 is present at a rotation by 180°, which, as aforesaid is shown in FIG. 2c. In this rotated condition, the two segments 28, 29 of the conveyor belt 15 are practically exchanged in their position on guide mechanism 22 with respect to their position on guide mechanism 23. FIG. 3 shows the two segments of the conveyor belt accordingly twisted, when the vertical belt supporting leg 10 is in its maximally rotated position.

In order to prevent the two belt segments 28, 29 from contacting each other with their inner sides 19, when the conveyor belt 15 is so far twisted, a spacer 25 is provided in half height or halfway between the belt guide mechanisms 22 and 23 (FIG. 2c). Spacer 25 preferably comprises, in an arrangement similar to the belt guide mechanisms 22, 23, two freely rotating backing rolls 60, 61 (FIG. 2b) which are not firmly supported in the vertical belt supporting leg 10, but are adapted to freely rotate in a horizontal plane with respect to same, i.e. about pivoting axis 9'. The bearing support means carried by the vertical leg 10 for mounting rolls 60, 61 are not shown in detail, but may be of any suitable construction for rotatably mounting such rolls while allowing the rolls to rotate horizontally in their angular position about the axis 9' through the vertical leg 10 with the segments 28, 29 of the conveyor belt 15. Due to their free horizontal rotatability, both backing rolls 60, 61 are carried along by conveyor belt 15 as it twists. They adjust themselves approximately to half of the angle of rotation, the vertical belt supporting leg 10 or, respectively, belt guide mechanism 22 occupies with respect to belt guide mechanism 23. FIG. 2b shows, at a maximum rotation of 180°, a rotated position of the spacer deviating by 90° from the two belt guide mechanisms 22, 23.

In a simplified embodiment, as shown in FIG. 3, a single backing roll 45, 55, 65 can take the place of each of the respective two backing rolls 40–41, 50–51, 60–61 of the belt guide mechanisms 22, 23 and of the spacer 25. As may be seen in FIG. 3, both segments 28, 29 of the conveyor belt 15 abut respectively each single backing roll 45, 55, 65.

In the drawings and specification there has been set forth a broad description of preferred embodiments of this invention, and although specific terms are employed, they are used in a descriptive sense only and not for purposes limitation.

We claim:

1. In a conveyor system for loading or unloading bulk material into and from large containers, particularly ships, and including a gantry, boom means having one end thereof mounted on said gantry for pivotal movement of said boom means about a horizontal axis in a vertical plane, a leg means adapted to extend from one end thereof downwardly from generally the other end of said boom means along a vertical axis, means for pivotally connecting the other end of said boom means to the one end of said leg means while allowing said leg means to maintain its vertical orientation regardless of the position of said boom means and for rotating said leg means about the vertical axis relative to said boom means, and conveyor belt means movably carried by said gantry, said boom means and said leg means for conveying the bulk material between the other end of said leg means and said gantry; the improvements in combination therewith, characterized by providing a simplified construction of said conveyor system for providing both loading and unloading operations and eliminating the necessity of plural conveyor belts, of:

said conveyor belt means comprising a single flexible continuous conveyor belt having inner and outer sides and defining conveying and returning segments extending between said gantry and the other end of said leg means, spaced-apart flexible corrugated walls mounted on said conveyor belt and extending generally outwardly from said outer side generally along and inwardly of the outer edges of said conveyor belt, and a plurality of spaced-apart cleat means mounted on said conveyor belt and extending generally outwardly from said outer side transversely between said corrugated walls for defining with said conveyor belt and said corrugated walls bucket-shaped compartments for conveying the bulk material;

separate spaced-apart guide means respectively carried by said connecting means and by said leg means at generally the other end thereof for receiving, guiding and maintaining each of the conveying and returning segments of said conveyor belt at the locations of said guide means in predetermined desired positions and planes relative to each other regardless of the rotational position of said leg means;

said conveyor belt being unrestrained between said guide means for allowing said flexible conveyor belt to twist therebetween with rotation of said leg means relative to said boom means; and means for selectively driving said conveyor belt in forward and reverse directions for loading and unloading bulk material.

2. In a conveyor system, as set forth in claim 1, in which each of said guide means comprises at least one elongate roll rotatably mounted in fixed angular position on said respective connecting means and leg means and positioned for transversely abutting said inner side of said conveyor belt, and two stub rolls for each of the conveying and returning segments of said conveyor belt and positioned for transversely abutting said outer side of said conveyor belt opposite said elongate roll along the outer edges of said conveyor belt and outwardly of said corrugated walls and rotatably mounted in fixed angular position on said respective connecting means and leg means; whereby, said guide means carried by said connecting means will remain and maintain the portion of said conveyor belt passing therethrough in a fixed angular position with respect to the vertical axis through said leg means, and said guide means carried by said leg means will rotate and rotate the portion of said conveyor belt passing therethrough with said leg means to allow twisting of said conveyor belt between said respective guide means.

3. In a conveyor system, as set forth in claim 1, further including spacer means carried by said leg means for rotation about the vertical axis therethrough and positioned between said guide means and between said conveying and returning segments of said conveyor belt for rotating with said conveyor belt as it is twisted and for spacing-apart said conveying and returning segments at said spacer means.

4. In a conveyor system, as set forth in claim 1, in which said boom means, said connecting means and said leg means comprise tubular members carrying said conveyor belt and said guide means therewithin for conveying the bulk material substantially within an enclosure.

5. In a conveyor system for loading or unloading bulk material into and from large containers, particularly ships, and including a gantry, boom means having one end thereof mounted on said gantry for pivotal movement of said boom means about a horizontal axis in a vertical plane, a leg means adapted to extend from one end thereof downwardly from generally the other end of said boom means along a vertical axis, a short transverse leg means mounted at one end thereof on the other end of said vertical leg means and extending generally horizontally outwardly therefrom and having bulk material pickup means on the other end thereof, means for pivotally connecting the other end of said boom means to the one end of said vertical leg means while allowing said vertical leg means to maintain its vertical orientation regardless of the position of said boom means and for rotating said vertical leg means and transverse leg means about the vertical axis relative to said boom means, and conveyor belt means movably carried by said gantry, said boom means, said vertical leg means and said transverse leg means for conveying the bulk material between said pickup means and said gantry; the improvement in combination therewith, characterized by providing a simplified construction of said conveyor system for providing both loading and unloading operations and eliminating the necessity of plural conveyor belts, of:

said conveyor belt means comprising a single flexible continuous conveyor belt having inner and outer sides and defining conveying and returning segments extending between said gantry and said pickup means, spaced-apart flexible corrugated walls mounted on said conveyor belt and extending generally outwardly from said outer side generally along and inwardly of the outer edges of said conveyor belt, and a plurality of spaced-apart cleat means mounted on said conveyor belt and extending generally outwardly from said outer side transversely between said corrugated walls for defining with said conveyor belt and said corrugated walls bucket-shaped compartments for conveying the bulk material;

separate spaced-apart guide means respectively carried by said connecting means and by said vertical leg means at generally the other end thereof for receiving, guiding and maintaining each of the conveying and returning segments of said conveyor belt at the locations of said guide means in predetermined desired positions and planes relative to each other regardless of the rotational position of said leg means, each of said guide means comprises at least one elongate roll rotatably mounted in fixed angular position on said respective connecting means and vertical leg means and positioned for transversely abutting said inner side of said conveyor belt, and two stub rolls for each of the conveying and returning segments of said conveyor belt and positioned for transversely abutting said outer side of said conveyor belt opposite said elongate roll along the outer edges of said conveyor belt and outwardly of said corrugated walls and rotatably mounted in fixed angular position on said respective connecting means and vertical leg means; whereby, said guide means carried by said connecting means will remain and maintain the portion of said conveyor belt passing therethrough in a fixed angular position with respect to the vertical axis through said leg means, and said guide means carried by said vertical leg means will rotate and rotate the portion of said conveyor belt passing therethrough with said leg means;

spacer means carried by said vertical leg means for rotation relative thereto about the vertical axis therethrough and positioned between said guide means and between said conveying and returning segments of said conveyor belt for rotating with said conveyor belt, and said conveyor belt being unrestrained between said guide means; whereby, said conveyor belt will twist between said guide means with rotation of said leg means relative to said boom means and said conveying and returning segments will be maintained in generally spaced-apart relationship by said spacer means;

said boom means, said connecting means and said leg means comprise tubular members carrying said conveyor belt, said guide means and said spacer means therewithin for conveying the bulk material substantially within an enclosure; and means for selectively driving said conveyor belt in forward and reverse directions for loading and unloading bulk material.

6. In a conveyor system, as set forth in claim 1 or 5, in which each of said guide means are positioned so that the vertical axis through said vertical leg means passes through the center of said guide means.

7. In a conveyor system, as set forth in claim 2 or 5, in which each of said guide means comprises two of said elongate rolls positioned for respectively abutting said inner side of said conveying and returning segments of said conveyor belt.

8. In a conveyor system, as set forth in claim 3 or 5, in which said spacer means comprises at least one elongate roll positioned for transversely abutting said inner side of said conveyor belt.

9. In a conveyor system, as set forth in claim 3 or 5, in which said spacer means comprises two elongate rolls positioned for respectively transversely abutting said inner side of said conveying and returning segments of said conveyor belt.

10. In a conveyor system, as set forth in claim 1 or 5, further including means carried by said gantry for receiving and guiding said conveyor belt in looped path of travel and for adjusting the length of said loop as said conveyor belt is twisted and untwisted for maintaining a desired tension on said conveyor belt.

* * * * *